United States Patent
Tsuyuguchi et al.

[11] Patent Number: 5,283,702
[45] Date of Patent: Feb. 1, 1994

[54] POWER SAVING SYSTEM FOR ROTATING DISK DATA STORAGE APPARATUS

[75] Inventors: Hiroshi Tsuyuguchi, Tokyo; Yoshio Hirose, Urawa; Kazuhiko Inoue, Hohya; Tohru Miura, Mitaka; Miya Enami, Higashikurume, all of Japan

[73] Assignee: TEAC Corporation, Tokyo, Japan

[21] Appl. No.: 746,773

[22] Filed: Aug. 16, 1991

[30] Foreign Application Priority Data

Aug. 21, 1990 [JP] Japan .................................. 2-219409

[51] Int. Cl.[5] ........................................... G11B 5/596
[52] U.S. Cl. ............................ 360/77.04; 360/77.02; 360/78.04
[58] Field of Search ................. 360/69, 70, 71, 72.1, 360/75, 77.01, 77.02, 77.04, 77.06, 77.07, 78.04

[56] References Cited

U.S. PATENT DOCUMENTS

| | | | |
|---|---|---|---|
| 4,635,145 | 1/1987 | Horie et al. | 360/78.04 |
| 4,691,255 | 9/1987 | Sakai et al. | 360/69 |
| 4,737,867 | 4/1988 | Ishikawa et al. | 360/69 |
| 4,812,928 | 5/1989 | Krause | 360/78.08 |

Primary Examiner—William L. Sikes
Assistant Examiner—Terry D. Cunningham
Attorney, Agent, or Firm—Woodcock Washburn Kurtz Mackiewicz & Norris

[57] ABSTRACT

A flexible magnetic disk drive is disclosed which has a stepper motor coupled to a data transducer via a steel belt motion translating mechanism for moving the transducer from track to track on the rotating disk in response to stepping pulses and a stepping direction signal from an external host system. In order to save power, the stepper motor is held deenergized while the disk drive motor is out of rotation, with the consequent possibility that the transducer may be displaced from the required track position on the disk while the stepper motor is held deenergized. Therefore, in order to always memorize the latest of the successive destination tracks commanded by the host system, a forward/backward counter is provided which counts the external stepping pulses in either direction depending upon the binary state of the external stepping direction signal. After the disk drive motor is set into rotation, stepping pulses and an stepping direction signal are generated internally for causing the stepper motor to automatically reposition the transducer on the memorized latest destination track.

4 Claims, 5 Drawing Sheets

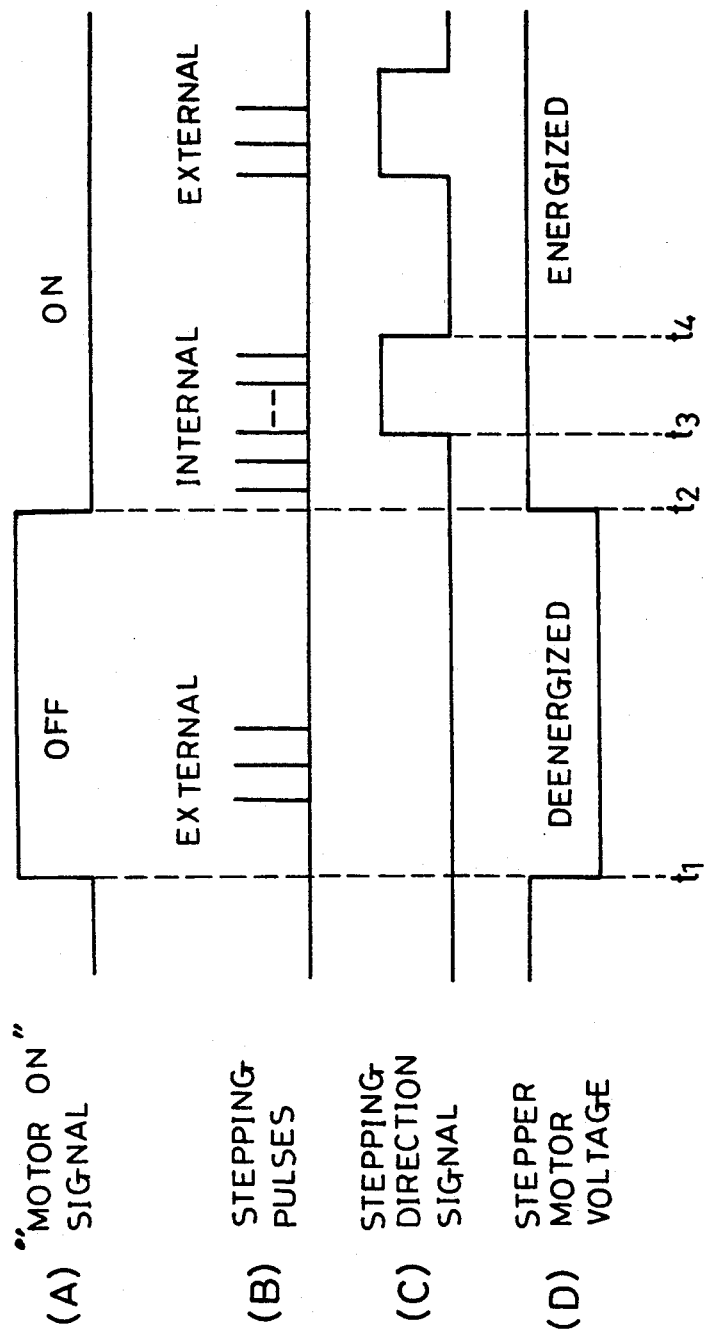

POWER SAVING SYSTEM FOR ROTATING DISK DATA STORAGE APPARATUS

BACKGROUND OF THE INVENTION

Our invention relates generally to an apparatus having a data transducer or transducers driven by an electric seek motor for accessing any of a multiplicity of concentric annular record tracks on a rotating disklike record medium such as a flexible magnetic disk which may be packaged in cassette or cartridge form. More specifically, our invention deals with a method of, and means for, saving power in such a rotating disk data storage apparatus by holding the seek motor unenergized when the data transducer or transducers are not in track seek operation.

Generally, in rotating disk data storage apparatus of the type under consideration, the seek motor takes the form of either a voice coil motor or a stepper motor. Our invention particularly concerns apparatus of the class employing the stepper motor for causing the data transducer or transducers to move to any desired tracks on the disk or disks.

The stepper motor has a rotor that rotates in short and essentially uniform angular movements, rather than continuously, in response to stepping pulses supplied from a host system external to the data storage apparatus. The stepwise rotation of the stepper motor is converted by a motion translating mechanism into the linear stepwise travel of the transducer or transducers for track to track accessing on the disk or disks. There are, here again, two familiar examples of the motion translating mechanism: one employs a lead screw, and the other a steel belt. An example of steel belt type motion translating mechanism is described and claimed in U.S. Pat. No. 4,774,611 filed by Ando and assigned to the assignee of the instant application.

The stepper motor need not be held energized throughout each period of operation of the data storage apparatus as the motor is used only for moving the transducer or transducers from track to track on the disk or disks. The continued energization of the stepper motor would involve a substantial waste of energy. It has therefore been suggested to hold the stepper motor unenergized when the transducer or transducers are out of seek operation. U.S. Pat. No. 4,783,706 filed by Shoji et al. and assigned to the assignee of our present application describes and claims such a power saving method and electronics for implementing the method.

We have found that the noted Shoji et al. U.S. patent has a drawback when the stepper motor is used in combination with the steel belt motion translating mechanism. The drawback arises because of the smaller detent torque exerted by the steel belt on the stepper motor than by the lead screw when the motor is disconnected from the power supply. Consequently, in event mechanical vibrations or shocks are applied to the stepper motor when it is unenergized, the rotor of the stepper has been very liable to be displaced with respect to the fixed motor windings, being no longer electromagnetically retained in the required angular position. Thus the transducer or transducers coupled to the rotor via the steel belt motion translating mechanism have been easy to be displaced from the required track positions on the disk or disks.

SUMMARY OF THE INVENTION

We have hereby invented how to avoid the waste of energy due to the continuous energization of the seek motor in rotating disk data storage apparatus of the type in question without giving rise to the noted problem heretofore encountered when the seek motor is coupled to the data transducer or transducers via a motion translating mechanism that exerts a relatively small detent torque on the motor.

Briefly stated in one aspect thereof, our invention concerns a power saving method for a data storage apparatus having a data transducer for data transfer with a disklike record medium having a multiplicity of annular data storage tracks arranged concentrically on at least one side thereof, the apparatus further having a disk drive motor for setting the record medium into rotation when a binary "motor on" signal is in a first state, and out of rotation when the "motor on" signal is in a second state, and a seek motor for causing the transducer to travel from track to track on the record medium. The power saving method of our invention dictates the deenergization of the seek motor when the "motor on" signal is in the second state, that is, when the disk drive motor is out of rotation. Since the transducer may be displaced from the required track position on the record medium while the seek motor is held deenergized, the latest of successive destination tracks represented by seek data, which are normally supplied when the "motor on" signal is in the first state, is always memorized. Each time the "motor on" signal regains the first state, the transducer is automatically repositioned on the memorized latest destination track on the record medium.

Usually, when a stepper motor is employed as the seek motor, the seek data are supplied by an external host system in the form of stepping pulses and a stepping direction signal. A stepper motor control circuit responds to the external stepping pulses and the external stepping direction signal by correspondingly controlling the stepper motor via a stepper motor drive circuit. Therefore, for repositioning the transducer on the latest destination track, we suggest that the apparatus be constructed to internally generate stepping pulses and a stepping direction signal which are similar respectively to the external stepping pulses and the external stepping direction signal. The internal stepping pulses and stepping direction signal may then be applied to the stepper motor control circuit after the "motor on" signal regains the first state, thereby causing the stepper motor to reposition the transducer. This scheme is preferred because not only the stepper motor but also its control circuit and drive circuit can all be used both for track seek operation in response to the external stepping signals and for the repositioning of the transducer in response to the internal stepping signals according to our invention.

At the time the "motor on" signal regains the first state, the current position of the transducer on the disk is first unknown because it may have been displaced from the latest destination track while the "motor on" signal has been in the second state. The transducer may therefore be temporarily moved to an endmost reference track on the disk and thence to the memorized latest destination track.

It is also possible according to the power saving method of our invention to incorporate two power supplies, having different supply voltages, in the stepper motor drive circuit. The stepper motor may be energized from the higher power supply for track seeking, and from the lower power supply for holding the transducer in position on the disk when the "motor on" signal is in the first state but when no external stepping pulses are being supplied. The stepper motor may be disconnected from both power supplies when the "motor on" signal gains the second state. After the "motor on" signal subsequently regains the first state, the transducer can be repositioned on the memorized latest destination track, with the stepper motor energized from the higher power supply while being driven by the internal stepping signals.

Another aspect of our invention concerns a rotating disk data storage apparatus constructed for carrying out the power saving method summarized above. Characteristically, the apparatus comprises a power switching circuit for causing the seek motor to be energized from a power supply when the "motor on" signal is in the first state, and to be deenergized when the "motor on" signal is in the second state, memory means for storing the latest of the successive destination tracks represented by the external seek data, and repositioning circuit means for automatically repositioning the transducer on the memorized latest destination track after the "motor on" signal regains the first state.

We recommend the use of a simple forward/backward counter as the memory means in the case where a stepper motor is employed as the seek motor. Since external stepping pulses and an external stepping direction signal are supplied as aforesaid from the external host system to the stepper motor control circuit for driving the stepper motor during track seeking, the forward/backward counter may count the external stepping pulses in either an increasing or a decreasing direction depending upon the binary state of the external stepping direction signal which is indicative of whether the transducer is to be moved radially inwardly or outwardly of the data storage disk. It is possible in this manner for the forward/backward counter to store always the latest of the successive destination tracks represented by the external stepping pulses and stepping direction signal.

The repositioning circuit means may comprise generators for generating internal stepping pulses and an internal stepping direction signal which are similar respectively to the external stepping pulses and the external stepping direction signal. The internal stepping pulses and stepping direction signal may both be applied to the stepper motor control circuit for repositioning the transducer on the memorized latest destination track after the "motor on" signal regains the first state.

We suggest the use of a second forward/backward counter for such repositioning of the transducer. As has been mentioned in connection with the foregoing summary of the method of our invention, the transducer is to be first moved to an endmost reference track on the disk before being repositioned on the latest destination track. Therefore, reset when the transducer arrives at the endmost reference track, the second forward/backward counter may start counting the internal stepping pulses in either an increasing or a decreasing direction depending upon the binary state of the internal stepping direction signal. Thus the counter will provide an output representative of the current position of the transducer on the disk. Outputs from both first and second forward/backward counters may be constantly compared, and the delivery of the internal stepping pulses to the stepper motor control circuit may be discontinued when the two outputs agree, that is, when the transducer is repositioned on the latest destination track.

We have thus succeeded in repositioning the transducer by making utmost use of the existing parts of the data storage apparatus. Moreover, as will become apparent from the subsequent description of preferred embodiments, the data storage apparatus incorporating the repositioning means is fully compatible with host systems of standard design.

The above and other features and advantages of our invention and the manner of realizing them will become more apparent, and the invention itself will best be understood, from a study of the following description and appended claims, with reference had to the attached drawings showing the preferred embodiments of our invention.

BRIEF DESCRIPTION OF THE DRAWINGS

FIG. 6, consisting of (A)-(D), is a combined waveform and timing diagram explanatory of the operation of the FIG. 5 apparatus.

DESCRIPTION OF THE PREFERRED EMBODIMENTS

Figure 1:
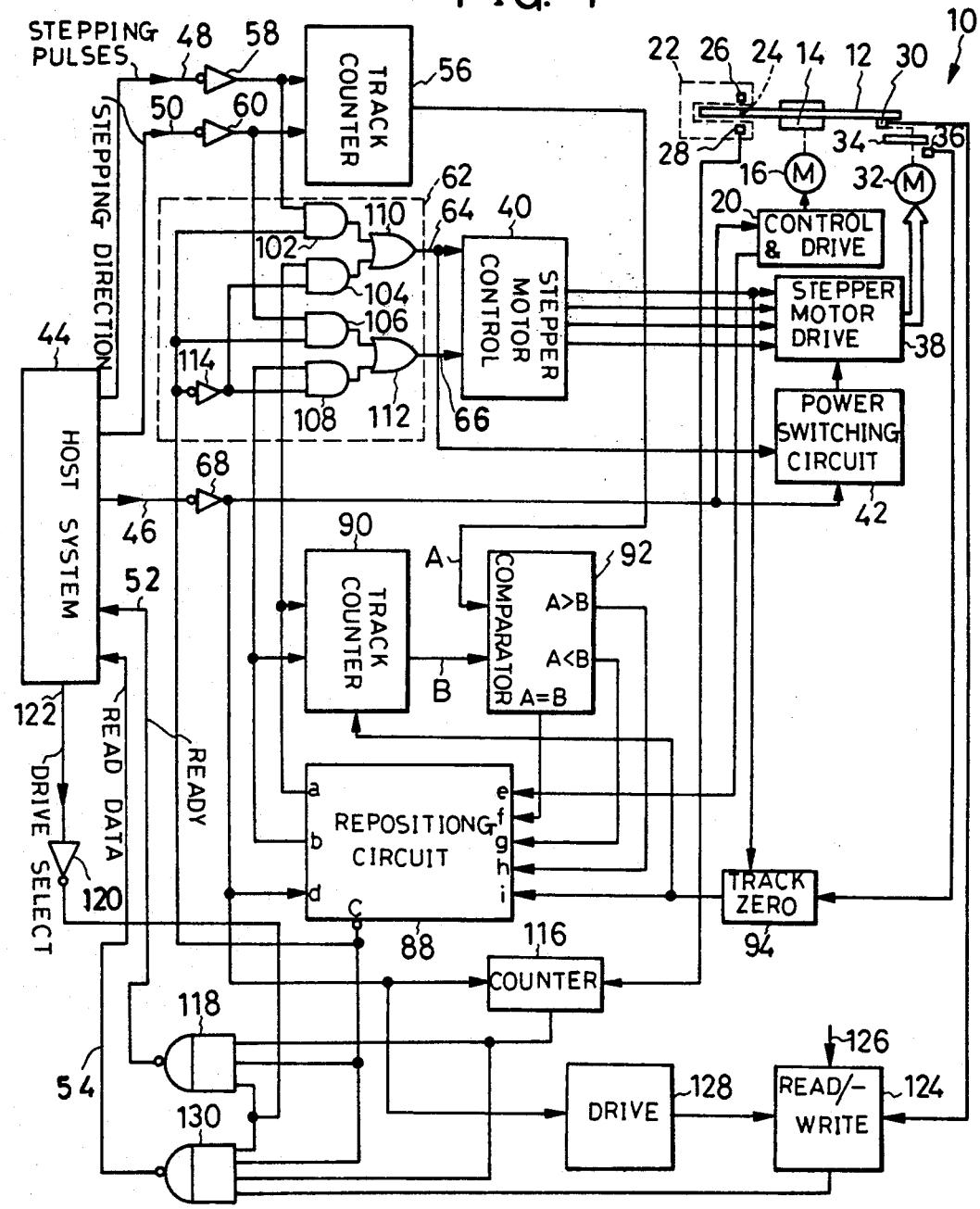
FIG. 1 is a block diagram of the rotating disk data storage apparatus constructed in accordance with the novel concepts of our invention.

We will now describe our invention in detail as embodied in the data storage apparatus for use with a flexible magnetic disk of five and a quarter inch diameter. The representative data storage apparatus, or disk drive according to common parlance, is generally designated 10 in FIG. 1 and therein shown together with the flexible magnetic disk 12 replaceably held in position therein by a drive hub assembly 14. A disk drive motor 16 is shown coupled directly to the drive hub assembly 14 for imparting rotation to the disk 12. A motor control and drive circuit 20 is connected to the disk drive motor 16 for controllably energizing the same. An index sensor 22 is provided for sensing an index mark on the disk 12 for providing a signal indicative of the angular position and velocity of the disk. The index mark is shown as a hole 24 formed eccentrically in the disk 12, and the index sensor 22 as an optical sensor of well known design comprising a light source 26 and a photoreceptor 28.

We assume for the convenience of disclosure that the disk 12 is single sided, having a multiplicity of concentric annular record tracks formed on one side only. Thus the apparatus 10 has but one data transducer 30 disposed opposite the track bearing surface of the disk 12. For moving the transducer 30 across the record tracks on the disk 12, a seek motor 32 is coupled to the transducer via a motion translating mechanism 34.

We also assume that in this embodiment of our invention, the seek motor 32 takes the form of a bidirectional, four phase stepper motor, and the motion translating mechanism 34 the steel belt device described and claimed in Ando U.S. Pat. No. 4,774,611, supra. The incremental rotation of the stepper motor 32 is translated by the steel belt motion translating mechanism into the linear stepwise travel of the transducer 30 from track to track on the disk 12. At 36 is seen a conventional "track zero" sensor capable of optically detecting the fact that the transducer 30 is over the outmost Track Zero on the disk 12 or thereabout.

The stepper motor 32 is driven by a motor drive circuit 38 under the control of a motor control circuit 40. A power switching circuit 42 is also connected to the stepper motor drive circuit 38 for the on/off power control of the stepper motor 32 according to our invention.

We have shown the disk drive 10 together with a host system 44 of standard design which controls its operation. The host system 44 is connected to the disk drive 10 via three output lines 46, 48 and 50 and two input lines 52 and 54. The output line 46 is for the delivery of a "motor on" signal indicative of whether the disk drive motor 16 is to be set into or out of rotation. The output line 48 is for the delivery of stepping pulses for causing the incremental rotation of the stepper motor 32. The output line 50 is for the delivery of a stepping direction signal indicative of the direction of rotation of the stepper motor 32. The input line 52 is for inputting a "ready" signal indicative of whether the disk 12 is ready for the commencement of data transfer with the transducer 30. The input line 54 is for inputting read data. Actually, there are many more signal lines between disk drive 10 and host system 44. We have not shown such additional signal lines because they have no direct pertinence to our invention.

As is standard in the disk drive art, the number of stepping pulses over the line 48 represents the number of record tracks on the disk 12 to be traversed by the transducer 30. The stepping direction signal over the line 50 is a binary signal, having a binary zero state for causing the transducer 30 to travel radially outwardly of the disk 12, and a binary one state for causing the transducer to travel radially inwardly of the disk. Thus the stepping pulses and the stepping direction signal constitute in combination seek data representative of a destination track on which the transducer 30 is to be positioned by the stepper motor 32 in cooperation with the steel belt motion translating mechanism 34.

The stepping pulse line 48 and the stepping direction signal line 50 are both connected to a track counter 56 via respective NOT circuits 58 and 60. The track counter 56 is a forward/backward counter, also known as a bidirectional counter, capable of counting input pulses in either an increasing or a decreasing direction. More specifically, the track counter 56 counts the stepping pulses in an increasing direction when the stepping direction signal is in a binary one state, commanding the transducer 30 to travel radially inwardly of the disk 12, and in a decreasing direction when the stepping direction signal is in a binary zero state commanding the transducer to travel radially outwardly of the disk. Thus the track counter 56 serves as a memory for storing the successive destination tracks commanded by the host system 44. Constantly updated, the track counter 56 will memorize only the latest track command from the host system 44.

Besides being connected to the track counter 56 as above, the stepping pulse line 48 and the stepping direction signal line 50 must be connected to the stepper motor control circuit 40 in order to enable the latter to generate the stepper motor control signals in response to the stepping pulses and the stepping direction signal. However, in this disk drive 10, the control circuit 40 must input not only the stepping pulses and the stepping direction signal from the external host system 44 but also those generated internally, within the disk drive itself, for repositioning the transducer 30 on the disk 12 according to our invention, as will be detailed subsequently.

Accordingly, the outputs of the NOT circuits 58 and 60 are connected to the stepper motor control circuit 40 via a stepping signal selector circuit 62 which permits selective passage therethrough of the external stepping pulses and stepping direction signal and the internal stepping pulses and stepping direction signal. The stepping signal selector circuit 62 has a first output line 64 for delivery of the external or internal stepping pulses to the stepper motor control circuit 40, and a second output line 66 for delivery of the external or internal stepping direction signal to the stepper motor control circuit. The stepper motor control circuit 40 conventionally responds to the incoming stepping pulses and stepping direction signal for supplying four phase control signals to the stepper motor drive circuit 38 thereby causing the same to drive the stepper motor 32 accordingly.

The power switching circuit 42 functions as aforesaid for the on/off control of power fed from drive circuit 38 to stepper motor 32. In order to perform this function the power switching circuit 42 has an input connected to the stepping pulse output line 64 of the stepping signal selector circuit 62, and another input connected to the "motor on" signal output line 46 of the host system 44 via a NOT circuit 68.

Figure 2:
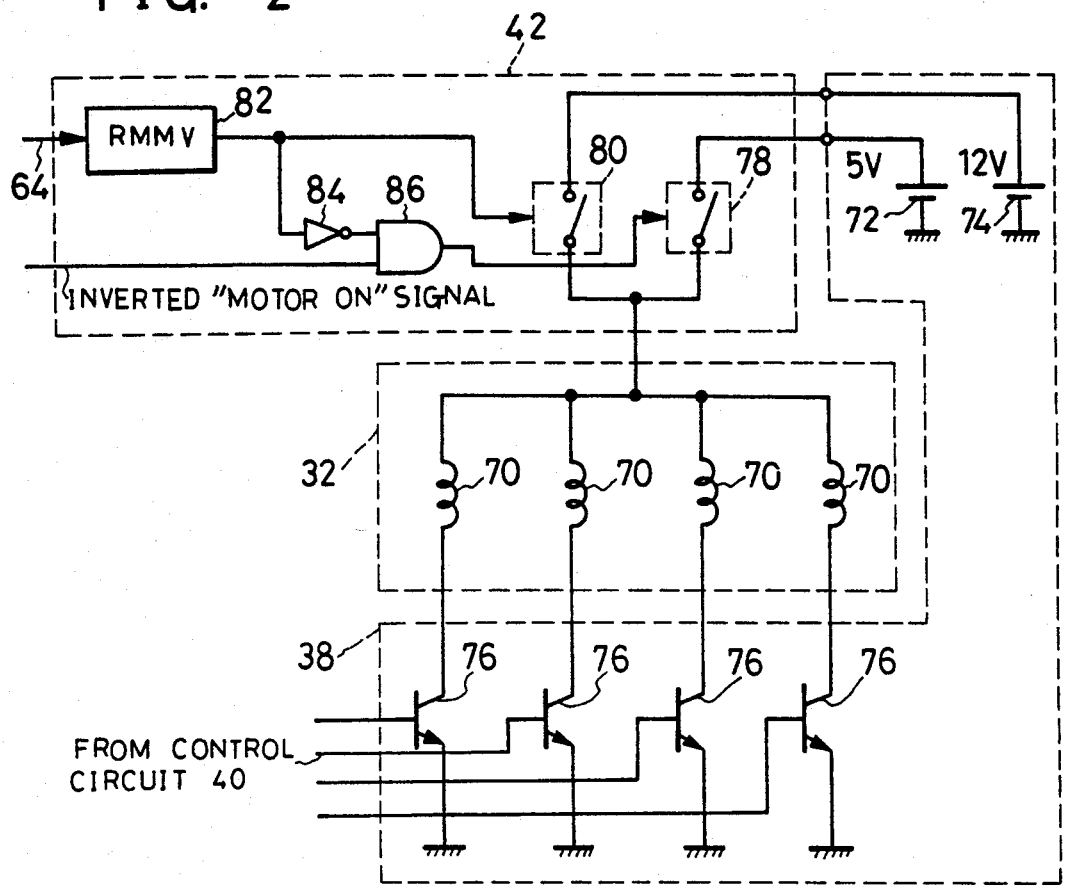
FIG. 2 is a schematic electrical diagram showing in more detail a stepper motor, a stepper motor drive circuit, and a power switching circuit, all included in the FIG. 1 apparatus.

We have diagramed in more detail in FIG. 2 the stepper motor 32, the stepper motor drive circuit 38 and the power switching circuit 42 as well as their interconnections. Although the diagram is highly schematic, it will nevertheless be seen that the stepper motor 32 has four phase fixed windings 70 to be excited one at a time to cause incremental rotation of a rotor, not shown, which is coupled to the data transducer 30 via the steel belt motion translating mechanism 34.

It will be also noted from FIG. 2 that the stepper motor drive circuit 38 has two power supplies, a low power supply 72 and a high power supply 74, in this particular embodiment. Typically, the low power supply 72 provides a supply voltage of five volts, and the high power supply 74 that of twelve volts. The power switching circuit 42 connects the high power supply 74 to the stepper motor 32 for energizing its windings 70 during track seek operation, and the low power supply 72 to the stepper motor for energizing its windings in order to electromagnetically hold the transducer 30 on the required track on the disk 12 during the rotation of the disk drive motor 14, as will become better understood as the description progresses.

The four phase windings 70 of the stepper motor 32 are interconnected, each at one extremity thereof, for joint connection to the power switching circuit 42 and thence to either of the low power supply 72 and high power supply 74. The other extremities of the stepper motor windings 70 are grounded via respective switching transistors 76 included in the stepper motor drive circuit 38. The bases of all the transistors 76 are separately connected to the stepper motor control circuit 40 for receiving therefrom the motor control signals that have been formed in response to the external or internal stepping pulses from the signal selector circuit 62. Thus, upon conduction of the four switching transistors 72 in response to the motor control signals, the four phase windings 70 of the stepper motor 32 are to be excited by either of the two power supplies 72 and 74, provided that the motor windings are electrically connected to either of the power supplies by the power switching circuit 42. The sequential excitation of the motor windings 70 results in the incremental rotation of the unshown rotor.

The power switching circuit 42 includes two electronically actuable power switches 78 and 80, such as transistors, connected respectively between the low power supply 72 and high power supply 74 of the stepper motor drive circuit 38 and the interconnected extremities of the stepper motor windings 70. Also included in the power switching circuit 42 are means for the on/off control of the power switches 78 and 80 in response to the external or internal stepping pulses from the signal selector circuit 62 and to the inverted "motor on" signal from the NOT circuit 68 on the "motor on" output line 46 of the host system 44. Such means include a retriggerable monostable multivibrator (RMMV) 82, a NOT circuit 84 and an AND gate 86.

The RMMV 82 has an input connected to the stepping pulse output line 64 of the stepping signal selector circuit 62. The output of the RMMV is connected directly to the high power switch 80 on one hand and, on the other hand, to the low power switch 78 via the NOT circuit 84 and the AND gate 86. The other input of the AND gate 86 is connected to the "motor on" output line 46 of the host system 44 via the NOT circuit 68.

The RMMV 82, per se well known in the art, is normally low, goes high when triggered by each external or internal stepping pulse, and remains high for a predetermined time before returning to the low state in which it is stable. The predetermined time during which the RMMV remains in the unstable high state is longer than the cycle of the stepping pulses. Accordingly, when triggered by a series of external or internal stepping pulses, the RMMV will go high in response to the first pulse and remain so until the lapse of the predetermined time following the last pulse of the series. The high power switch 80 will be held closed as long as the RMMV 82 remains high, connecting the high power supply 74 to the stepper motor windings 70. It is thus seen that the stepper motor 32 is energized from the high power supply 74 for driving the transducer 30 both in its track seek operation in response to the external stepping pulses from the host system 44, and in its transducer repositioning operation in response to the internal stepping pulses.

Since the RMMV 82 is connected to the AND gate 86 via the NOT circuit 84, the low power switch 78 is open when the RMMV is high in response to the stepping pulses, that is, when the high power switch 80 is closed. The low power switch 78 is also open when the NOT circuit 68, FIG. 1, is low, that is, when the "motor on" signal is high, commanding the disk drive motor 16 to be held out of rotation. In other words, the low power switch 78 is closed only when the "motor on" signal is low, commanding the rotation of the disk drive motor 16, and when, at the same time, the power switching circuit 42 is receiving no external or internal stepping pulses. The consequent energization of the stepper motor 32 from the low power supply 72 during such periods is effective to hold the transducer 30 in position on the disk 12.

As will be apparent from the foregoing, the stepper motor 32 is held deenergized from either of the power supplies 72 and 74 when the disk drive motor 16 is out of rotation, unless then the host system 44 delivers stepping pulses to the disk drive 10. With the stepper motor 32 thus held completely deenergized for saving power, the unshown rotor of the stepper motor may be angularly displaced with respect to the motor windings 70 because of the low detent torque exerted thereon by the steel belt motion translating mechanism 34, resulting in the displacement of the data transducer 30 from the required track position on the magnetic disk 12.

We have employed the track counter 56, FIG. 1, in order to overcome this inconvenience. Since the track counter 56 memorizes the latest destination track commanded by the host system 44, the data transducer 30 can be automatically repositioned on this destination track on the disk 12 even if it has been displaced in either direction therefrom while the stepper motor 32 has been held unenergized, as will be discussed in more detail hereafter. Incidentally, the host system 44 may deliver stepping pulses while the "motor on" signal is high, commanding the disk drive motor 16 to be held out of rotation. In this case the high power switch 80 will become closed thereby connecting the high power supply 74 to the stepper motor windings 70.

For such automatic repositioning of the transducer 30 on the latest destination track on the disk 12, we have employed, in addition to the track counter 56, a repositioning circuit 88, a second track counter 90, a digital comparator 92 and a "track zero" detector circuit 94, all as shown in FIG. 1.

Figure 3:
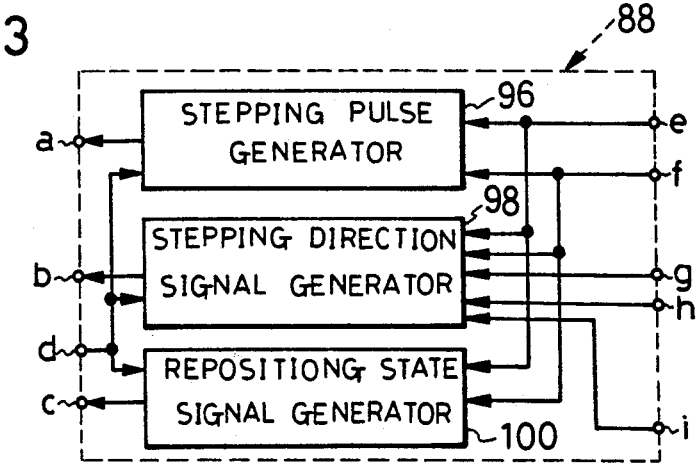
FIG. 3 is a block diagram showing in more detail the repositioning circuit of the FIG. 1 apparatus.

As illustrated in more detail in FIG. 3, the repositioning circuit 88 comprises an internal stepping pulse generator 96, an internal stepping direction signal generator 98 and a repositioning state signal generator 100. As the name implies, the repositioning state signal generator 100 generates a signal indicative of whether the transducer 30 is being repositioned on the disk 12 after possible accidental displacement from the latest destination track while the stepper motor 32 has been held completely deenergized. These generators 96, 98 and 100 are connected to the outputs a, b and c, respectively, of the repositioning circuit 88. The generators 96–100 are also jointly connected to a reset input d for inputting the inverted "motor on" signal from the NOT circuit 68, FIG. 1, so that the generators are all reset when the "motor on" signal goes low, commanding the disk drive motor 16 to be set into rotation.

It will also be noted from FIG. 3 that the generators 96–100 are all connected to a repositioning start signal input e and to a repositioning complete signal input f. These inputs e and f are for inputting signals for causing the generators 96–100 to start and end, respectively, the production of the noted signals for repositioning the transducer 30. The repositioning start signal input e is connected to a motor current detector circuit, not shown, built into the disk drive motor control and drive circuit 20. The repositioning complete signal input f is connected to the (A=B) output of the comparator 92.

The internal stepping direction signal generator 98 is additionally connected to a step in input g, a step out input h and an additional input i. The step in input g and step out input h are connected to the (A<B) output and (A>B) output, respectively, of the comparator 92. The additional input i is connected to the "track zero" detector circuit 94.

The second track counter 90 is connected to the outputs a and b of the repositioning circuit 88 for inputting the internal stepping pulses and the internal stepping direction signal therefrom. Like the first track counter 56, this second track counter 90 is also a forward/backward counter. Thus the second track counter 90 counts the internal stepping pulses in an increasing direction when the internal stepping direction signal is high, commanding the transducer 30 to travel radially inwardly of the disk 12, and in a decreasing direction when the internal stepping direction signal is low, commanding the transducer to travel radially outwardly of the disk. The second track counter 90 has a reset input connected to the "track zero" detector circuit 94.

It will be recalled that the first track counter 56 serves as a memory for storing the latest track position of the transducer 30 commanded by the external host system 44. The second track counter 90, then, serves to register the current track position of the transducer 30 being repositioned on the disk 12 in response to the internal stepping pulses and stepping direction signal from the repositioning circuit 88.

The digital comparator 92 has two inputs connected respectively to the first and the second track counters 56 and 90. Let A be the output from the first track counter 56, and B the output from the second track counter 90. It will be seen, then, that A represents the latest destination track commanded by the host system 44, and B the current track position of the transducer 34 being repositioned by the internal stepping pulses and stepping direction signal. The comparator 90 produces a high output from its (A>B) output when A is greater than B, from its (A<B) output when A is less than B, and from its (A=B) output when A is equal to B. Functionally, therefore, the comparator 90 determines whether the transducer 30 is positioned radially inwardly or outwardly of, or on, the destination track while being repositioned on the disk 12.

The stepping signal selector circuit 62 comprises four AND gates 102, 104, 106 and 108, two OR gates 110 and 112, and a NOT circuit 114. The AND gate 102 has an input connected to the NOT circuit 58, and another input to the output c of the repositioning state signal generator circuit 100, FIG. 3, of the repositioning circuit 88. The output of the AND gate 102 is connected to the OR gate 110 and thence to the stepping pulse input of the stepper motor control circuit 40. Therefore, the selector circuit 62 will permit the passage of the external stepping pulses from the host system 44 on to the stepper motor control circuit 40 when the transducer 30 is not being repositioned.

The AND gate 104 has a first input connected to the internal stepping pulse output a of the repositioning circuit 88, and another input connected via the NOT circuit 114 to the repositioning state signal output c of the repositioning circuit 88. The output of the AND gate 104 is connected to the OR gate 110 and thence to the stepping pulse input of the stepper motor control circuit 40. Thus the selector circuit 62 will permit the passage of the internal stepping pulses from the repositioning circuit 88 on to the stepper motor control circuit 40 only when the transducer 30 is being repositioned.

The AND gate 106 has an input connected to the NOT circuit 60, and another input connected to the repositioning state signal output c of the repositioning circuit 88. The output of the AND gate 106 is connected to the OR gate 112 and thence to the stepping direction signal input of the stepper motor control circuit 40. Accordingly, the selector circuit 62 will permit the passage of the external stepping direction signal from the host system 44 on to the stepper motor control circuit 40 when the transducer 30 is not being repositioned.

The AND gate 108 has an input connected to the stepping direction signal output b of the repositioning circuit 88, and another input connected via the NOT circuit 114 to the repositioning state signal output c of the repositioning circuit. The output of the AND gate 108 is connected to the OR gate 112 and thence to the stepping direction signal input of the stepper motor control circuit 40. Thus the selector circuit 62 will permit the passage of the internal stepping direction signal from the repositioning circuit 88 on to the stepper motor control circuit 40 when the transducer 30 is being repositioned.

We have stated that the "track zero" detector circuit 94 forms a part of the means for automatically repositioning the transducer 30 on the latest destination track on the disk 12. The detection of the fact that the transducer 30 is on Track Zero on the disk is necessary because the transducer must be temporarily returned to that track before being repositioned on the latest destination track, as will become apparent from the subsequent description of operation.

As will be noted from FIG. 1, the "track zero" detector circuit 94 has two inputs, one connected to the "track zero" sensor 36, and the other to the first phase control output line of the stepper motor control circuit 40. This is because the optical "track zero" sensor 36 is by itself incapable of accurately sensing the fact that the transducer 30 is on Track Zero on the disk 12, relying as it does on the position of a linearly movable member of the motion translating mechanism 34 toward that end.

Therefore, with a view to the more accurate detection of the "track zero" position of the transducer 30 on the disk 12, the optical "track zero" sensor 36 is connected to the "track zero" detector circuit 94 along with the first phase control output line of the stepper motor control circuit 40. We presuppose in making the above statement that the stepper motor 32 has its first phase windings energized when the transducer 30 is on Track Zero on the disk 12, according to standard practice in the art. The "track zero" detector circuit 94 determines that the transducer 30 is on Track Zero when the "track zero" sensor 36 indicates that the transducer is in that position and when, at the same time, the stepper motor control circuit 40 puts out the first phase control signal to the stepper motor drive circuit 38 to cause excitation of the first phase windings.

After the transducer 39 has been repositioned on the latest destination track, too, the host system 44 must be informed of the fact that the disk drive 10 has become ready for the commencement of data transfer between disk 12 and transducer 30. We have employed to this end a "ready" counter 116 and a NAND gate 118. The "ready" counter 116 has an input connected to the index sensor 22 for counting the index pulses, and a reset input connected to the NOT circuit 68 for inputting the inverted "motor on" signal. Therefore, after having been reset when the "motor on" signal goes high, the "ready" counter 116 goes high when a predetermined number (e.g. two) of index pulses are received, that is, when the disk 12 picks up speed to a predetermined degree.

The NAND gate 118 has an input connected to the "ready" counter 116, another input connected to the repositioning state signal output c of the repositioning circuit 88, and still another input connected via a NOT circuit 120 to the drive select output line 122 of the host system 44. The output of the NAND gate 118 is connected to the "ready" input line 52 of the host system 44.

The repositioning state signal goes high upon completion of the repositioning of the transducer 30. As is standard in the disk drive art, drive select signals are needed when two or more disk drives are daisy chained to the host system 44, in order to enable the host system to select whichever of the disk drives for data transfer with the associated disk. Consequently, the NAND gate 118 will go low, informing the host system 44 that the disk drive 10 is ready for the commencement of data transfer with the disk 12, when: (a) the "ready" counter 116 goes high to indicate that the disk 12 has picked up speed to a predetermined degree; (b) the repositioning state signal output c of the repositioning circuit 88 goes high to indicate the completion of transducer repositioning; and, at the same time, (c) the inverted drive select signal from the NOT circuit 120 goes high to choose this disk drive 10 for data transfer with the disk 12.

The disk drive 10 conventionally includes a read/write circuit 124 connected to the transducer 30. The read/write circuit 124 comprises a write circuit for supplying to the transducer 30 a write current representative of write data fed over a line 126, and a read circuit for processing the output from the transducer into well defined pulses representative of the read data. A drive circuit 128 for electrically powering the read/write circuit 124 is connected via the NOT circuit 68 to the "motor on" output line 46 of the host system 44. The drive circuit 128 powers the read/write circuit 124 only when the "motor on" signal is low, commanding the rotation of the disk drive motor 16, since the read/write circuit needs to be so powered only during the progress of data transfer between disk 12 and transducer 30. Power consumption by the read/write circuit 124 is thus reduced to a minimum required.

The read data output of the read/write circuit 124 is connected to the host system 44 via a NAND gate 130. This NAND gate has another input connected via the NOT circuit 120 to the drive select output line 122 of the host system 44, yet another input connected to the repositioning state signal output c of the repositioning circuit 88, and still another input connected to the "ready" counter 116. Therefore, the read data is sent into the host system 44 only when all the following conditions are met: (a) the "ready" counter 116 is high to indicate that the disk 12 has picked up speed to a predetermined degree; (b) the repositioning state signal is high to indicate the completion of transducer positioning; and (c) the inverted drive select signal is high to choose this disk drive 10 for data transfer with the associated disk 12.

OPERATION

Figure 4:
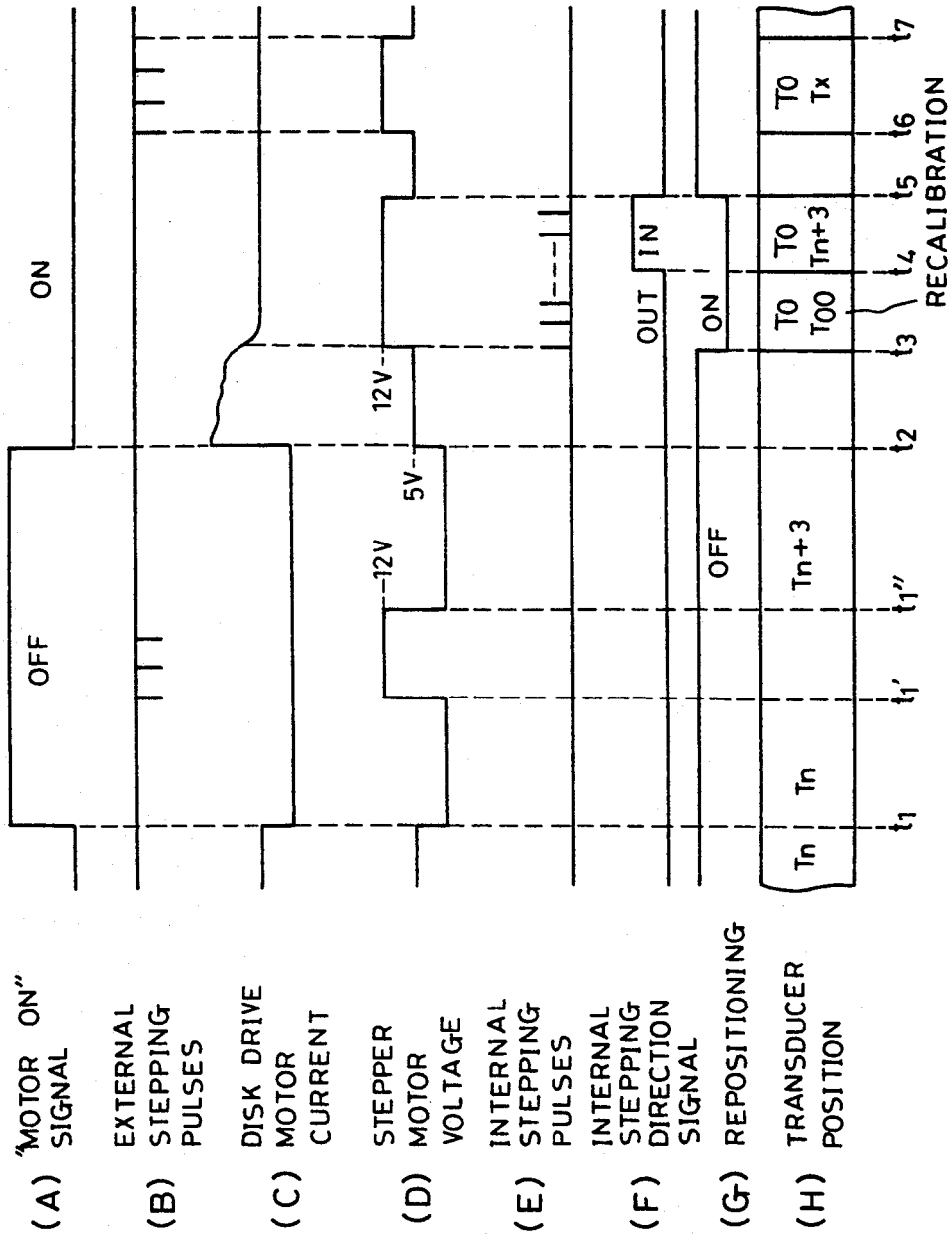
FIG. 4, consisting of (A)-(H), is a combined waveform and timing diagram explanatory of the operation of the FIG. 1 apparatus.

We will refer to the combined waveform and timing diagram of FIG. 4 for the description of operation of the disk drive 10 constructed as shown in FIGS. 1-3. We have plotted this diagram on the assumption that the disk drive motor 16 has been in rotation before a time $t_1$, with the "motor on" signal held low as at (A) in FIG. 4. The transducer 30 has been positioned on some track Tn on the disk 12, as at (H) in FIG. 4, according to the latest destination track command from the host system 44. This latest destination track Tn will have been memorized as aforesaid by the first track counter 56 on the basis of the external stepping pulses and stepping direction signal that have been fed from the host system 44 via the NOT circuits 58 and 60.

Also, before the time $t_1$, the stepper motor 32 has been energized from the low power supply 72, FIG. 2, of the stepper motor drive circuit 38, as at (D) in FIG. 4. This is because the low power switch 78 is closed when the "motor on" signal is low (inverted "motor on" signal high) and when, at the same time, no external or internal stepping pulses are being generated. The energization of the stepper motor 32 from the low power supply 72 is effective to hold the transducer 30 on the latest destination track Tn.

The "motor on" signal from the host system 44 is shown to go high at the time $t_1$. Then, as the NOT circuit 68 on the "motor on" line 46 goes low, the control and drive circuit 20 will deenergize the disk drive motor 16 as at (C) in FIG. 4.

Moreover, as will be understood by referring back to FIG. 2, the AND gate 86 of the power switching circuit 42 will be disabled by the low output from the NOT circuit 68. The power switch 78 will then open to disconnect the low power supply 72 from the stepper motor windings 70. The other power switch 80 is, of course, open since neither external nor internal stepping pulses are now being supplied from the stepping signal selector circuit 62. Thus, as indicated at (D) in FIG. 4, the stepper motor 32 will become completely deenergized at the time $t_1$ in order to save power. The "motor on" signal is shown to remain high until a time $t_2$. The stepper motor 32 is to be held disconnected from both power supplies 72 and 74 during this time interval $t_1$-$t_2$, provided that no stepping pulses are received from the host system 44.

Rarely will the host system 44 put out stepping pulses while the "motor on" signal is high, as during the period $t_1$-$t_2$ in FIG. 4. Let us, however, assume a rare case where three stepping pulses are received from the host system 44 during a time interval $t_1'$-$t_1''$ within the period $t_1$-$t_2$, as indicated at (B) in FIG. 4. Then, as the RMMV 82, FIG. 2, of the power switching circuit 42 goes high in response to the external stepping pulses, the power switch 80 will be closed to permit the stepper motor windings 70 to be energized from the high power supply 74, as at (D) in FIG. 4. The external stepping pulses will also be directed through the signal selector circuit 62 into the stepper motor control circuit 40, with the result that the stepper motor 32 rotates to cause the transducer 30 to travel from track Tn to track Tn+3 on the disk 12.

As desired, the illustrated circuitry of the disk drive 10 may be modified to maintain the stepper motor 32 out of rotation in the face of such possible external stepping pulses incoming when the "motor on" signal is high. Even if the stepper motor 32 is so left out of rotation in order to save power, the new destination track represented by these external pulses will be stored on the first track counter 56. Therefore, when the "motor on" signal subsequently goes low, the transducer 30 will be positioned on that new destination track.

We have nevertheless employed the illustrated circuitry because the stepping pulses supplied from the host system when the "motor on" signal is high are mostly for recalibration, that is, for returning the transducer to Track Zero on the disk. The repositioning of the transducer on the latest destination track after the period $t_1$-$t_2$ according to our invention also requires that the transducer be returned to Track Zero preparatory to being repositioned on the latest destination track. Accordingly, if the transducer has already been positioned on Track Zero before the "motor on" signal goes low at the time $t_2$, the repositioning of the transducer will be unnecessary. It is of course possible that after having been positioned on Track Zero, the transducer be slightly displaced therefrom during the period $t_1''$-$t_2$. Even in that case, however, the transducer will be repositioned on Track Zero in a much shorter time than when the stepper motor 32 is held deenergized in spite of the external stepping pulses supplied when the "motor on" signal is high.

Thus the latest destination track before the time $t_2$ may be either track Tn or track Tn+3 depending upon whether the stepper motor 32 was driven in response to the external stepping pulses supplied during the period $t_1$-$t_2$. Either way, since the stepper motor 32 is held completely deenergized during the period $t_1$-$t_2$ or the periods $t_1$-$t_1'$ and $t_1''$-$t_2$, the transducer 30 may be displaced from the latest destination track Tn or Tn+3 because of mechanical vibrations or shocks that may be exerted on the disk drive 10 during such period or periods. Our invention makes it possible to automatically reposition the transducer on the latest destination track Tn or Tn+3 when, or after, the "motor on" signal goes low at the time $t_2$ commanding the disk drive motor 16 to be set into rotation again.

We recommend that the repositioning of the transducer be not started immediately when the "motor on" signal goes low at the time $t_2$. As indicated at (C) in FIG. 4, a large starting current will usually flow through the disk drive motor 16 when the "motor on" signal goes low at the time $t_2$. Should the repositioning operation be started at this time $t_2$, a similarly large starting current would flow into the stepper motor 32, too, because then the stepper motor would be connected to the high power supply 74 via the power switch 80. The simultaneous flow of such large starting currents to the two motors 16 and 32 is of course objectionable.

We therefore suggest that the repositioning of the transducer 30 be started at a time $t_3$ when the starting current of the disk drive motor 16 subsides to a predetermined level slightly above the normal magnitude of the motor current. It is toward this end that the repositioning start signal input e, FIG. 1, of the repositioning circuit 88 is connected to the unshown motor current detector circuit built into the disk drive motor control and drive circuit 20.

However, as will be understood from FIG. 2, the low power switch 78 of the power switching circuit 42 will become closed at the time $t_2$ when the "motor on" signal goes low. The five volt supply voltage will then be impressed to the stepper motor 32, although this low supply voltage serves no useful purpose at this time.

Then, at the time $t_3$, the repositioning circuit 88 will start generating the signals for repositioning the transducer 30 on the latest destination track on the disk 12, in response to the repositioning start signal from the disk drive motor control and drive circuit 20. The transducer 30 must first be positioned on Track Zero before being repositioned on the latest destination track.

Accordingly, as indicated at (E) and (F) in FIG. 4, the generators 96 and 98, FIG. 3, of the repositioning circuit 88 will generate the internal stepping pulses and internal stepping direction signal necessary for temporarily positioning the transducer on Track Zero. Applied to the RMMV 82, FIG. 2, of the power switching circuit 42, the internal stepping pulses will cause the high power switch 80 to be closed for application of the twelve volt supply voltage to the stepper motor 32. The low power switch 78, which has been closed, will open upon application of the internal stepping pulses to the RMMV 82.

As will be seen from (G) in FIG. 4, the repositioning state signal from its generator 100, also included in the repositioning circuit 88, will go low in response to the repositioning start signal to indicate the start and progress of transducer repositioning. A reference back to FIG. 1 will reveal that the repositioning state signal is applied directly to the AND gates 102 and 106 of the stepping signal selector circuit 62. Thus disabled, the AND gates 102 and 106 will inhibit the application of the external stepping pulses and stepping direction signal from the host system 44 to the stepper motor control circuit 40. The repositioning state signal is also applied directly to the NAND gates 118 and 130 thereby preventing the delivery of the "ready" signal and read data to the host system 44.

The repositioning state signal is, however, inverted before being applied to the AND gates 104 and 108 of the stepping signal selector circuit 62. These AND gates 104 and 108 are therefore enabled to permit the passage therethrough of the internal stepping pulses and stepping direction from the repositioning circuit 88. Thus the stepper motor control circuit 40 will respond to the internal stepping pulses and stepping direction signal by applying the corresponding control signals to the stepper motor drive circuit 38, which in turn will cause the stepper motor windings to be energized from the high power supply 74 accordingly.

It will be observed from (F) in FIG. 4 that the internal stepping direction signal remains low after the time $t_3$, commanding the travel of the transducer 30 radially outwardly of the disk 12. Thus the transducer 30 will start traveling radially outwardly of the disk 12 at the time $t_3$ until the transducer arrives at the outermost Track Zero on the disk at a time $t_4$.

Upon arrival of the transducer 30 at Track Zero, the "track zero" detector circuit 94 will ascertain the fact on the bases of both the output from the optical "track zero" sensor 36 and the first phase control signal delivered from stepper motor control circuit 40 to stepper motor drive circuit 38. The output from the "track zero" detector circuit 94 will be impressed to the input i of the repositioning circuit 88 and, therefore, to the internal stepping direction signal generator 98, FIG. 3, included in the repositioning circuit. Thereupon the internal stepping direction signal will go high, commanding the travel of the transducer 30 radially inwardly of the disk 12. The internal stepping pulse generator 96 will continue the production of internal stepping pulses.

FIG. 1 shows that the output from the "track zero" detector circuit 94 is also impressed to the reset input of the second track counter 90. Therefore, reset at the time $t_4$, the second bidirectional track counter 90 will start counting the internal stepping pulses from the output a of the repositioning circuit 88 in an increasing direction, since then the internal stepping direction signal from the output b of the repositioning circuit is high. The resulting output B from the second track counter 90 represents the current track position of the transducer 30, as contrasted with the output A from the first track counter 56 which represents the latest destination track commanded by the external host system 44 before the time $t_2$. The latest destination track in this case is track $Tn+3$ if we assume that the stepper motor 32 was driven in response to the external stepping pulses during the period $t_1$-$t_2$.

The comparator 92 will constantly compare the outputs A and B from the two track counters 56 and 90 during the radially inward travel of the transducer 30 toward the latest destination track $Tn+3$. Initially, of course, A will be greater than B, so that the comparator 92 will produce from its (A>B) output a signal commanding the internal stepping direction signal generator 98 to remain high in order to cause the continuation of the radially inward travel of the transducer 30.

Possibly, the transducer 30 may overrun the latest destination track $Tn+3$ for some reason or other. In that case, since A becomes less than B, the comparator 92 will produce from its (A<B) output a signal commanding the internal stepping direction signal generator 98 to go low in order to cause the reversal of the traveling direction of the transducer 30.

FIG. 4 shows that the transducer arrives at the latest destination track $Tn+3$ at a time $t_5$. Thereupon the comparator 92 will produce from its (A=B) output a signal commanding the internal stepping pulse generator 96 to discontinue the production of the internal stepping pulses, the stepping direction signal generator 98 to go low, and the repositioning state signal generator 100 to go high.

Then, as the output c of the repositioning circuit 88 goes high, the AND gates 102 and 106 of the stepping signal selector circuit 62 will be enabled to permit the passage of the external stepping pulses and stepping direction signal from the host system 44 on to the stepper motor control circuit 44. The NAND gates 51 and 56 will also be enabled to permit the delivery of the "ready" signal and read data to the host system 44.

Since the "motor on" signal has been low since the time $t_2$, as at (A) in FIG. 4, the host system 44 may put out a new seek command during the period $t_3$-$t_5$ when the disk drive 10 is in the act of repositioning the transducer 30 on the previous destination track $Tn+3$. The new destination track will then immediately replace the previous destination track in the first track counter 56, and the comparator 92 will compare the current track position of the transducer 30 with the new destination track, so that the transducer will be repositioned on the new destination track. If the new destination track is radially outward of the current transducer position, that is, if A becomes less than B, then the comparator 92 will cause the internal stepping direction signal to go low. The transducer 30 will be subsequently repositioned on the new destination track through the procedure set forth above.

Upon completion of transducer repositioning at the time $t_5$, the low power switch 78, FIG. 2, of the power switching circuit 42 will be closed since the inverted "motor on" signal is then high and since no stepping pulses are being applied to the RMMV 82. Therefore, as indicated at (D) in FIG. 4, the five volt supply voltage will be impressed to the stepper motor 32 in order to hold the transducer 30 repositioned on the latest destination track.

At (B) in FIG. 4 is shown a series of external stepping pulses delivered from the host system 44 during a subsequent period $t_6$-$t_7$ for having the transducer 30 positioned on some track Tx other than the latest destination track. Then, as indicated at (D) in FIG. 4, the power switching circuit 42 will switch the stepper motor 32 from the five volt power supply 72 to the twelve volt power supply 74 in response to the external stepping pulses. Energized from the high power supply 74, the stepper motor 32 will operate to cause the transducer 30 positioned on the new destination track Tx.

SECOND FORM

Figure 5:
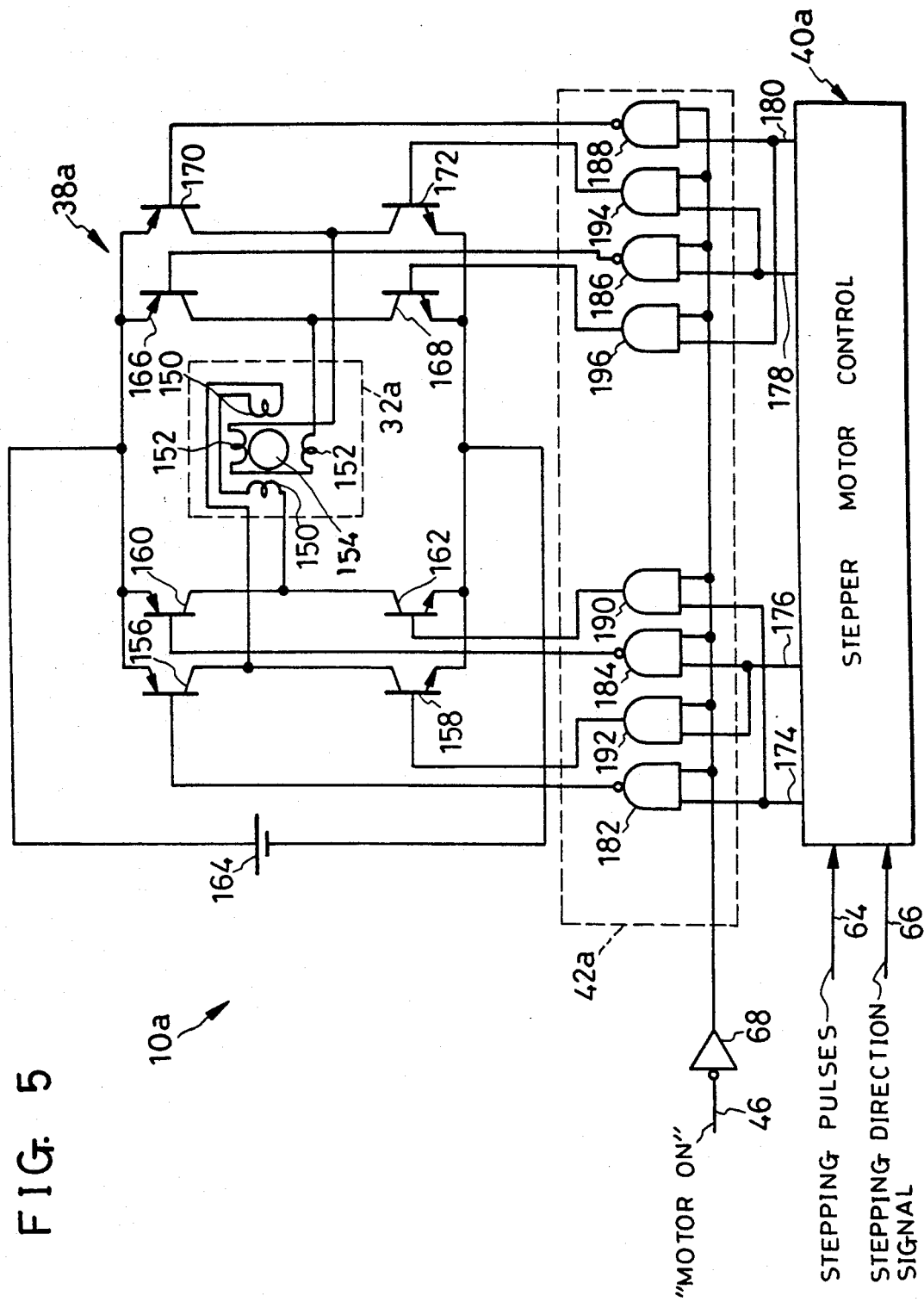
FIG. 5 is a partial schematic electrical diagram of another preferred form of rotating disk data storage apparatus according to our invention.

In an alternate disk drive 10a shown in FIG. 5 we have employed a bipolar drive stepper motor 32a in substitution for the four phase drive stepper motor 32 of the FIG. 1 disk drive 10. Per se well known in the art, the bipolar drive stepper motor 32a has two groups of fixed windings 150 and 152, with each group comprised of two or more such windings. The fixed windings 150 and 152 are disposed at constant angular spacings about the axis of rotation of a rotor 154.

A bipolar drive circuit 38a for the stepper motor 32a comprises a bridge connection of four switching transistors 156, 158, 160 and 162 connected between one group of stepper motor windings 150 and a direct current power supply 164. Another bridge connection of four switching transistors 166, 168, 170 and 172 is connected between the other group of stepper motor windings 152 and the power supply 164. It will be noted that the transistors 156, 160, 166 and 170 are pnp transistors whereas the transistors 158, 162, 168 and 172 are npn transistors. Consequently, the first group of windings 150 are energized forwardly when the transistors 156 and 162 are both conductive, and reversely when the transistors 158 and 160 are both conductive. The second group of windings 152 are energized forwardly when the transistors 166 and 172 are both conductive, and reversely when the transistors 168 and 170 are both conductive.

The construction and operation of the stepper motor 32a and its bipolar drive circuit 38a as so far described are conventional, and therein lies no feature of our invention. The novel features of our invention will appear in the course of the following description.

Like the stepper motor control circuit 40 of the FIG. 1 disk drive 10, a control circuit 40a for the bipolar drive circuit 38a has two inputs connected respectively to the two output lines 64 and 66 of the stepping signal selector circuit seen at 62 in FIG. 1. The stepper motor control circuit 40a has four output lines 174, 176, 178 and 180 connected via a power switching circuit 42a to the bases of the transistors 156-162 and 166-172 of the bipolar drive circuit 38a. Thus the stepper motor control circuit 40a puts out stepper motor control signals over the lines 174-180 in response to either the external stepping pulses and stepping direction signal from the host system 44 or the internal stepping pulses and stepping direction signal from the repositioning circuit 88.

The power switching circuit 42a of this disk drive 10a differs from the corresponding circuit 42 of the FIG. 1 disk drive 10 in being connected between stepper motor control circuit 40a and drive circuit 38a. The power switching circuit 42a comprises four NAND gates 182, 184, 186 and 188 and four AND gates 190, 192, 194 and 196.

The first output line 174 of the stepper motor control circuit 40a is connected on one hand to the first NAND gate 182 and thence to the base of the first transistor 156 of the bipolar drive circuit 38a and, on the other hand, to the first AND gate 190 and thence to the base of the fourth transistor 162 of the bipolar drive circuit. The second output line 176 of the stepper motor control circuit 40a is connected on one hand to the second NAND gate 184 and thence to the base of the third transistor 160 of the bipolar drive circuit 38a and, on the other hand, to the second AND gate 192 and thence to the base of the second transistor 158 of the bipolar drive circuit. The third output line 178 of the stepper motor control circuit 40a is connected on one hand to the third NAND gate 186 and thence to the base of the fifth transistor 166 of the bipolar drive circuit 38a and, on the other hand, to the third AND gate 194 and thence to the base of the eighth transistor 172 of the bipolar drive circuit. The fourth output line 180 of the stepper motor control circuit 40a is connected on one hand to the fourth NAND gate 188 and thence to the base of the seventh transistor 170 of the bipolar drive circuit 38a and, on the other hand, to the fourth AND gate 196 and thence to the base of the sixth transistor 168 of the bipolar drive circuit.

All the NAND gates 182-188 and AND gates 190-196 of the power switching circuit 42a have additional inputs connected to the "motor on" signal line 46 via the NOT circuit 68. Accordingly, when the "motor on" signal is low so that the output from the NOT circuit 68 is high, the NAND gates and AND gates of the power switching circuit 42a are all enabled to permit the passage of the stepper motor control signals from the control circuit 40a on to the bipolar drive circuit 38a. The output lines 174 and 178 of the stepper motor control circuit 40a go high to cause the stepper motor windings 150 and 152 to be energized forwardly. The output lines 176 and 180 go high to cause the stepper motor windings 150 and 152 to be energized reversely.

We have illustrated in FIG. 5 only the stepper motor 32a, stepper motor drive circuit 38a and control circuit 40a, and power switching circuit 42a of the alternative disk drive 10a. The other details of construction of this disk drive 10a can be exactly as set forth above in connection with the first disclosed disk drive 10 and with reference to FIGS. 1 and 3.

OPERATION OF SECOND FORM

Reference may be had to the timing chart of FIG. 6 for the following operational description of the disk drive 10a. The "motor on" signal on the host system output line 46 is shown at (A) in FIG. 6 to be low from time $t_1$ to time $t_2$. Since the "motor on" signal is inverted by the NOT circuit 68, all the AND gate 190-196 of the power switching circuit 42a go low whereas all the NAND gates 182-188 go high. All the transistors 156-162 and 166-172 of the stepper motor drive circuit 38a are therefore nonconductive during the period $t_1$-$t_2$.

As has been mentioned with reference to FIG. 4 depicting the operation of the FIG. 1 disk drive 10, the host system 44 may put out stepping pulses during the high state of the "motor on" signal, as indicated at (B) in FIG. 6. Although the power switching circuit 42, FIG. 2, of the disk drive 10 responded to such stepping pulses by connecting the high power supply 74 to the stepper motor 32, the power switching circuit 42a of the alternate disk drive 10a has no means for responding to stepping pulses. Therefore, in this alternate disk drive 10a, the stepper motor 32a remains unenergized in the face of the external stepping pulses supplied during the high state of the "motor on" signal, as will be noted from (D) in FIG. 6. Of course, a modification may be made in the disk drive 10a for energizing the stepper motor 32a in response to such stepping pulses.

It is understood that the disk drive 10a includes the track counter 56, FIG. 1, for memorizing the latest destination track commanded by the host system before the time $t_1$. After the "motor on" signal goes low at the time $t_2$, the data transducer is to be automatically repositioned on this latest destination track through the following procedure, since the transducer may have been displaced therefrom during the period $t_1$-$t_2$ when the stepper motor 32a has been held unenergized.

When the "motor on" signal goes low at the time $t_2$ to command the rotation of the disk drive motor, the NAND gates 182-188 and AND gates 190-196 of the power switching circuit 42a are all enabled, so that the stepper motor control circuit 40a becomes possible to control the stepper motor 32a in response to the internal stepping pulses and stepping direction signal from the repositioning circuit 88.

At (B) in FIG. 6 is shown that in this alternate embodiment, the repositioning circuit 88 starts the production of internal stepping pulses immediately when the "motor on" signal goes low at the time $t_2$. It will also be noted from (C) in FIG. 6 that the internal stepping direction signal remains low after the time $t_2$ to cause the transducer to be first positioned on Track Zero on the disk and then goes high at a time $t_3$ to cause the transducer to travel toward the latest destination track. Then the transducer will be repositioned on the latest destination track at a time $t_4$.

POSSIBLE MODIFICATIONS

Although we have shown and described our invention in very specific aspects thereof and as embodied in five and a quarter inch magnetic disk drives, we recognize, of course, that our invention could be embodied in other forms and is not to be limited by the exact details of the foregoing disclosure. The following, then, is a brief list of possible modifications, alterations or adaptations of the illustrated embodiments which we believe all fall within the scope of our invention:

1. In the FIG. 1 disk drive 10 the repositioning of the transducer on the latest destination track could be started immediately when the "motor on" signal went low at the time $t_2$ in FIG. 4, provided that the system power supply was of sufficiently large capacity.

2. In FIG. 4 the repositioning of the transducer on the latest destination track could be started at the time $t_3$ upon lapse of a predetermined period after the "motor on" signal had gone low at the time $t_2$, instead of by relying on the magnitude of the current being fed to the disk drive motor.

3. The FIG. 5 disk drive 10a could be modified to include another power supply of smaller voltage for holding the stepper motor energized in the absence of external or internal stepping pulses while the "motor on" signal was low, as in the FIG. 1 disk drive 10.

What we claim is:

1. A power saving method for a data storage apparatus having a data transducer for data transfer with a disklike record medium having a multiplicity of annular data storage tracks arranged concentrically on at least one side thereof, the apparatus further having a disk drive motor for setting the record medium into rotation when a binary "motor on" signal is in a first state, and out of rotation when the "motor on" signal is in a second state, a seek motor for causing the transducer to travel from track to track on the record medium, and a high and a low power supply for energizing the seek motor, the high power supply having a higher supply voltage than the low power supply, which method comprises:

(a) supplying seek data representative of successive destination tracks on the record medium on which the transducer is to be positioned by the seek motor;

(b) energizing the seek motor from the high power supply when the seek data is being supplied, in order to enable the seek motor to position the transducer on the successive destination tracks;

(c) energizing the seek motor from the low power supply when the "motor on" signal is in the first state but when no seek data is being supplied, in order to enable the seek motor to hold the transducer on each destination track;

(d) always memorizing the latest of the successive destination tracks represented by the seek data;

(e) saving power by disconnecting the seek motor from both high and low power supplies when the "motor on" signal gains the second state and by holding the seek motor deenergized until the "motor on" signal subsequently regains the first state, with the consequent possibility that while the seek motor is held deenergized, the transducer may be displaced from the destination track on the record medium which has been represented by the seek data before the seek motor becomes deenergized; and (f) repositioning the transducer on the memorized latest destination track on the record medium after the "motor on" signal regains the first state.

2. The power saving method of claim 1 wherein the data storage tracks on the record medium include a reference track and wherein the transducer is repositioned on the memorized latest destination track on the record medium after being temporarily moved to the reference track.

3. A data storage apparatus for use with a disklike record medium having a multiplicity of annular data storage tracks arranged concentrically on at least one side thereof, the apparatus adapted to be coupled to a host system generating external stepping pulses and an external stepping direction signal, the apparatus comprising:

(a) a disk drive motor for imparting rotation to the record medium;

(b) a data transducer for data transfer with the record medium while the record medium is in rotation;

(c) a stepper motor for causing the data transducer to travel from track to track on the record medium;

(d) a stepper motor drive circuit having a high and a low power supply for selectively energizing the stepper motor, the high power supply having a higher supply voltage than the low power supply;

(e) first input means for inputting external stepping pulses and an external stepping direction signal from the host system, these pulses and signal being conjointly representative of successive destination tracks on the record medium on which the transducer is to be positioned by the stepper motor;

(f) a stepper motor control circuit connected between the first input means and the stepper motor drive circuit for causing the stepper motor drive circuit to drive the stepper motor so as to cause the transducer to be positioned on the successive destination tracks on the record medium represented by the external stepping pulses and the external stepping direction signal;

(g) second input means for inputting a binary "motor on" signal having a first state for causing the disk drive motor to be set into rotation, and a second state for causing the disk drive motor to be set out of rotation;

(h) a power switching circuit connected between the second input means and the stepper motor drive circuit for causing the stepper motor to be energized from the high power supply when the stepping pulses are being input, in order to enable the stepper motor to position the transducer on the successive destination tracks, for causing the stepper motor to be energized from the low power supply when the "motor on" signal is in the first state but when no stepping pulses are being input, in order to enable the stepper motor to hold the transducer on each destination track, and for disconnecting the stepper motor from both high and low power supplies when the "motor on" signal gains the second state and by holding the stepper motor deenergized until the "motor on" signal subsequently regains the first state, with the consequent possibility that while the stepper motor is held deenergized, the transducer may be displaced from the destination track on the record medium which has been represented by the external stepping pulses and the external stepping direction signal before the stepper motor becomes deenergized;

(i) memory means connected to the first input means for storing the latest of the destination tracks represented by the external stepping pulses and the external stepping direction signal;

(j) first means connected to the stepper motor control circuit for delivering thereto internal stepping pulses and an internal stepping direction signal, which are similar respectively to the external stepping pulses and the external stepping direction signal, after the "motor on" signal regains the first state, the stepper motor control circuit responding to the internal stepping pulses and the internal stepping direction signal for causing the transducer to travel toward the latest destination track on the record medium from which the transducer may have been displaced while the stepper motor is held deenergized, said internal stepping pulses and stepping direction signal being "internal" in that they are generated by the data storage apparatus, as opposed to the external stepping pulses and stepping direction signal which are generated externally to the apparatus by the host system; and (k) second means connected to the memory means and the first means for causing said first means to discontinue the delivery of the internal stepping pulses to the stepper motor control circuit when the transducer is repositioned on the latest destination track on the record medium.

4. The data storage apparatus of claim 3 wherein the power switching circuit comprises:

(a) a first power switch connected between the stepper motor and the high power supply of the stepper motor drive circuit;

(b) a second power switch connected between the stepper motor and the low power supply of the stepper motor drive circuit;

(c) a pulse generator connected to the first input means for generating, in response to each external stepping pulse, an output pulse of predetermined duration for closing the first power switch; and (d) logic circuit means connected to both the pulse generator and the second input means for closing the second power switch when the "motor on" signal is in the first state but when no external stepping pulses are being input to the pulse generator.

* * * * *